(12) United States Patent
Takeda

(10) Patent No.: US 9,284,439 B2
(45) Date of Patent: Mar. 15, 2016

(54) TIRE RUBBER COMPOSITE AND PNEUMATIC TIRE

(71) Applicant: The Yokohama Rubber Co., LTD., Minato-ku, Tokyo (JP)

(72) Inventor: Shinya Takeda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/397,161

(22) PCT Filed: Apr. 24, 2013

(86) PCT No.: PCT/JP2013/062066
§ 371 (c)(1),
(2) Date: Oct. 24, 2014

(87) PCT Pub. No.: WO2013/161876
PCT Pub. Date: Oct. 31, 2013

(65) Prior Publication Data
US 2015/0148447 A1    May 28, 2015

(30) Foreign Application Priority Data

Apr. 24, 2012 (JP) ................................. 2012-098775

(51) Int. Cl.
| | |
|---|---|
| *C08K 3/36* | (2006.01) |
| *B60C 1/00* | (2006.01) |
| *C08L 9/06* | (2006.01) |
| *C08L 93/00* | (2006.01) |
| *C08L 15/00* | (2006.01) |
| *C08C 19/44* | (2006.01) |
| *C08K 3/04* | (2006.01) |
| *C08L 47/00* | (2006.01) |
| *C08L 57/02* | (2006.01) |

(52) U.S. Cl.
CPC ... *C08L 9/06* (2013.01); *B60C 1/00* (2013.01); *B60C 1/0016* (2013.04); *C08C 19/44* (2013.01); *C08K 3/04* (2013.01); *C08K 3/36* (2013.01); *C08L 15/00* (2013.01); *C08L 47/00* (2013.01); *C08L 57/02* (2013.01); *C08L 93/00* (2013.01); *C08K 2201/006* (2013.01); *C08L 2205/025* (2013.01); *C08L 2205/03* (2013.01)

(58) Field of Classification Search
CPC ........ B60C 1/0016; C08K 3/36; C08L 15/00; C08L 93/00
See application file for complete search history.

(56) References Cited

U.S. PATENT DOCUMENTS

| | | | |
|---|---|---|---|
| 6,506,829 B1 * | 1/2003 | Materne et al. ............... | 524/493 |
| 2011/0144236 A1 * | 6/2011 | Mihara ........................ | 523/158 |
| 2014/0155520 A1 * | 6/2014 | Takeda ........................ | 523/156 |
| 2015/0031791 A1 | 1/2015 | Sugiura | |

FOREIGN PATENT DOCUMENTS

| | | |
|---|---|---|
| DE | 11 2013 000 983 | 12/2014 |
| JP | 2008-101127 | 5/2008 |
| JP | 2009-091498 | 4/2009 |
| JP | 2009-138157 | 6/2009 |
| JP | 2009-263587 | 11/2009 |
| JP | 2011-094012 | 5/2011 |
| JP | 2011-132307 | 7/2011 |
| JP | 2013-036025 | 2/2013 |
| WO | WO 2013/057993 | 4/2013 |
| WO | WO 2013/122237 | 8/2013 |

* cited by examiner

*Primary Examiner* — Vickey Nerangis
(74) *Attorney, Agent, or Firm* — Thorpe North & Western

(57) ABSTRACT

A rubber composition for tires comprises: per 100 parts by weight of diene rubber containing from 5 to 50 wt. % of terminally modified S-SBR, from 2 to 50 parts by weight of an aromatic modified terpene resin having a softening point of 100° C. or higher. A total content of 60 to 130 parts by weight of two types of silica, that is silica X and silica Y. A functional group of the modified S-SBR has reactivity with a silanol group. A proportion of the silica relative to a total amount of a reinforcing filler containing the silica X, the silica Y, and an optionally compounded carbon black is 85 wt. % or greater. A nitrogen adsorption specific surface area of the silica X is 140 $m^2/g$ or greater; a nitrogen adsorption specific surface area of the silica Y is greater than 100 $m^2/g$ and less than 140 $m^2/g$.

18 Claims, 4 Drawing Sheets

|  |  | Comparative Example 1 | Working Example 1 | Working Example 2 | Working Example 3 | Working Example 4 | Working Example 5 | Comparative Example 2 | Comparative Example 3 | Comparative Example 4 |
|---|---|---|---|---|---|---|---|---|---|---|
| Modified S-SBR 1 | pbw | 90.8 (66) | 90.8 (66) | 100.4 (73) | 79.2 (53) | 45.4 (33) | 90.8 (66) | 79.2 (53) | 79.2 (53) | 114.1 (83) |
| Modified S-SBR 2 | pbw |  | 17 |  |  |  | 17 |  |  |  |
| Unmodified SBR | pbw |  |  |  |  |  |  | 41.3 (30) |  |  |
| BR | pbw |  |  | 10 | 30 | 50 |  |  | 30 |  |
| NR | pbw | 17 | 17 | 17 | 17 | 17 | 17 | 17 | 17 | 17 |
| Silica X1 | pbw | 80.0 | 69.0 | 69.0 | 60.0 | 60.0 | 40.0 | 60.0 | 60.0 | 60.0 |
| Silica Y1 | pbw |  | 11.0 | 11.0 | 10.0 | 10.0 | 40.0 | 10.0 | 10.0 | 10.0 |
| Carbon black | pbw | 10.0 | 10.0 | 10.0 | 10.0 | 10.0 | 10.0 | 10.0 | 10.0 | 10.0 |
| Coupling agent | pbw | 6.4 | 6.4 | 6.4 | 5.6 | 5.6 | 6.4 | 5.6 | 5.6 | 5.6 |
| Modified terpene resin 1 | pbw | 0.0 | 10.0 | 7.5 | 7.5 | 7.5 | 10.0 | 7.5 | 7.5 | 7.5 |
| Aroma oil | pbw | 20.0 | 10.0 | 10.0 | 17.5 | 20.0 | 10.0 | 6.0 | 17.5 | 6.3 |
| Silica proportion | wt.% | 88.9 | 88.9 | 88.9 | 87.5 | 87.5 | 88.9 | 87.5 | 87.5 | 87.5 |
| Wet performance | Index value | 100 | 115 | 110 | 110 | 105 | 110 | 97 | 95 | 110 |
| Rolling resistance | Index value | 100 | 115 | 115 | 130 | 165 | 130 | 112 | 140 | 95 |
| Wear resistance | Index value | 100 | 110 | 105 | 113 | 113 | 105 | 102 | 102 | 93 |

FIG. 1

| | | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|
| Modified S-SBR 1 | pbw | 110 (80) | 38.5 (28) | 90.8 (66) | 90.8 (66) | 90.8 (66) | 90.8 (66) | 90.8 (66) | 90.8 (66) | 90.8 (66) |
| Modified S-SBR 2 | pbw | 3 | 55 | 17 | 17 | 17 | 17 | 17 | 17 | 17 |
| NR | pbw | 17 | 17 | 17 | 17 | 17 | 17 | 17 | 17 | 17 |
| Silica X1 | pbw | 69.0 | 69.0 | 69.0 | 75.0 | 80.0 | 72.0 | 25.0 | 46.0 | 100.0 |
| Silica Y1 | pbw | 11.0 | 11.0 | 11.0 | 0.0 | 0.0 | 8.0 | 55.0 | 9.0 | 35.0 |
| Carbon black | pbw | 10.0 | 10.0 | 10.0 | 15.0 | 10.0 | 10.0 | 10.0 | 35.0 | |
| Coupling agent | pbw | 6.4 | 6.4 | 6.4 | 6.0 | 6.4 | 6.4 | 6.4 | 4.4 | 10.8 |
| Modified terpene resin 1 | pbw | 10.0 | 10.0 | | 10.0 | 10.0 | 10.0 | 10.0 | 10.0 | 10.0 |
| Modified terpene resin 2 | pbw | | | 10.0 | | | | | | |
| Aroma oil | pbw | 10.0 | 10.0 | 10.0 | 10.0 | 10.0 | 10.0 | 10.0 | 10.0 | 10.0 |
| Silica proportion | wt.% | 88.9 | 88.9 | 88.9 | 83.3 | 88.9 | 88.9 | 88.9 | 61.1 | 100.0 |
| Wet performance | Index value | 103 | 97 | 95 | 100 | 118 | 116 | 98 | 90 | 125 |
| Rolling resistance | Index value | 95 | 170 | 180 | 80 | 87 | 95 | 135 | 75 | 67 |
| Wear resistance | Index value | 95 | 115 | 118 | 113 | 110 | 110 | 98 | 125 | 90 |

FIG. 2

| | | Working Example 6 | Working Example 7 | Working Example 8 | Working Example 9 | Comparative Example 14 | Comparative Example 15 | Comparative Example 16 |
|---|---|---|---|---|---|---|---|---|
| Modified S-SBR 1 | pbw | 72.9 (53) | 90.8 (66) | 90.8 (66) | 90.8 (66) | 90.8 (66) | 90.8 (66) | 90.8 (66) |
| Modified S-SBR 2 | pbw | 30 | 17 | 17 | 17 | 17 | 17 | 17 |
| NR | pbw | 17 | 17 | 17 | 17 | 17 | 17 | 17 |
| Silica X1 | pbw | 75.0 | | | | | | 40.0 |
| Silica X2 | pbw | | 69.0 | | | | | |
| Silica X3 | pbw | | | 69.0 | 69.0 | 69.0 | | |
| Silica Y1 | pbw | 15.0 | 11.0 | 11.0 | | | | |
| Silica Y2 | pbw | | | | 11.0 | | 40.0 | |
| Silica Z | pbw | | | | | 11.0 | | 40.0 |
| Carbon black | pbw | 10.0 | 10.0 | 10.0 | 10.0 | 10.0 | 10.0 | 10.0 |
| Coupling agent | pbw | 5.6 | 6.4 | 6.4 | 6.4 | 6.4 | 6.4 | 6.4 |
| Modified terpene resin 1 | pbw | 15.0 | 10.0 | 10.0 | 10.0 | 10.0 | 10.0 | 10.0 |
| Aroma oil | pbw | 15.0 | 10.0 | 10.0 | 10.0 | 10.0 | 10.0 | 10.0 |
| Silica proportion | wt % | 90.0 | 88.9 | 88.9 | 86.9 | 88.9 | 88.9 | 88.9 |
| Wet performance | Index value | 120 | 118 | 120 | 115 | 105 | 92 | 118 |
| Rolling resistance | Index value | 115 | 112 | 110 | 107 | 120 | 180 | 90 |
| Wear resistance | Index value | 110 | 120 | 118 | 120 | 95 | 85 | 110 |

FIG. 3

| Common components of the rubber compositions | |
|---|---|
| Zinc oxide | 3.0 pbw |
| Stearic acid | 2.0 pbw |
| Antiaging agent | 3.0 pbw |
| Sulfur | 2.2 pbw |
| Vulcanization accelerator 1 | 2.3 pbw |
| Vulcanization accelerator 2 | 1.0 pbw |

FIG. 4

TIRE RUBBER COMPOSITE AND PNEUMATIC TIRE

TECHNICAL FIELD

The present technology relates to a rubber composition for tires and a pneumatic tire by which low rolling resistance, wet grip performance, and wear resistance are enhanced beyond conventional levels.

BACKGROUND TECHNOLOGY

In recent years, the JATMA (Japan Automobile Tyre Manufacturers Association) labeling (display) system has been introduced for pneumatic tires for passenger cars, and such tires require superior levels of both low rolling resistance and wet grip performance. In particular, the required level of wet grip performance is extremely high, and a pneumatic tire able to achieve grade a in terms of wet grip performance based on this labeling system has yet to be developed. At the same time, improvement in wear resistance has been demanded in order to extend tire life.

It is known that, conventionally, silica is blended in rubber compositions constituting tread portions of pneumatic tires in order to enhance the balance between low rolling resistance and wet grip performance. However, silica readily aggregates due to the presence of surface silanol groups, and because silica exhibits poor affinity for diene rubber, silica dispersibility can be poor and, in such cases, the effect of modifying the dynamic visco-elasticity properties, such as the loss tangent (tan δ), of a rubber composition cannot be satisfactorily achieved. In addition, there is another problem that reinforcing effects of silica is lower than that of carbon black and wear resistance can be insufficient, and when the dispersibility is poor, the wear resistance can be further lowered.

To resolve this problem, Japanese Unexamined Patent Application Publication No. 2009-091498A proposes enhancing dispersibility of silica by a rubber composition compounding silica in solution polymerization-produced terminally modified styrene-butadiene rubber in which terminals are modified with a polyorganosiloxane or the like. Although this rubber composition exhibits effects of enhancing rolling resistance, wet grip performance, and wear resistance, levels of improvement that is demanded by consumers for low rolling resistance, wet grip performance, and wear resistance are even higher, and further improvement in balance between these performances has been demanded.

SUMMARY

The present technology provides a rubber composition for tires and a pneumatic tire by which low rolling resistance, wet grip performance, and wear resistance can be enhanced to or beyond conventional levels.

The rubber composition for tires of the present technology is a rubber composition for tires comprising: per 100 parts by weight of diene rubber containing from 5 to 50 wt. % of solution polymerization-produced terminally modified styrene-butadiene rubber (modified S-SBR) having a vinyl unit content of 25 wt. % or greater and a glass transition temperature of −50° C. or lower, from 2 to 50 parts by weight of an aromatic modified terpene resin having a softening point of 100° C. or higher, and a total content of 60 to 130 parts by weight of two types of silica, that is silica X and silica Y; a functional group of the modified S-SBR having reactivity with a silanol group on a surface of the silica; a proportion of the silica relative to a total amount of a reinforcing filler containing the silica X, the silica Y, and an optionally compounded carbon black being 85 wt. % or greater; a nitrogen adsorption specific surface area of the silica X being 140 m$^2$/g or greater; a nitrogen adsorption specific surface area of the silica Y being greater than 100 m$^2$/g and less than 140 m$^2$/g; and if a compounded amount of the silica X relative to 100 parts by weight of the diene rubber is x parts by weight and a compounded amount of the silica Y relative to 100 parts by weight of the diene rubber is y parts by weight, a relationship x/7<y≤x being satisfied.

Furthermore, the pneumatic tire of the present technology is a pneumatic tire using the rubber composition for tires described above.

The rubber composition for tires of the present technology contains from 2 to 50 parts by weight of an aromatic modified terpene resin having a softening point of 100° C. or higher in diene rubber containing from 5 to 50 wt. % of modified S-SBR having a vinyl unit content of 25 wt. % or greater, a glass transition temperature of −50° C. or lower, and a functional group having reactivity with a silanol group; the compounded amount of the two types of specific silica, that is silica X and silica Y, having a particulate form described above is limited; and a proportion of the silica relative to a total amount of a reinforcing filler is 85 wt. % or greater. Therefore, the rubber composition for tires of the present technology can enhance dispersibility of the silica and enhance low rolling resistance, wet grip performance, and wear resistance to or beyond conventional levels.

As a functional group of the modified S-SBR, a hydroxyl group, which has excellent reactivity with a silanol group on a surface of the silica and can improve dispersibility of the silica, is preferable.

A pneumatic tire that uses the rubber composition for tires of the present technology can enhance low rolling resistance, wet grip performance, and wear resistance to or beyond conventional levels.

BRIEF DESCRIPTION OF THE DRAWINGS

FIG. 1 illustrates the compounding proportion and evaluation of each composition of the working examples and the comparative examples of the present technology.

FIG. 2 illustrates the compounding proportion and evaluation of each composition of the comparative examples of the present technology.

FIG. 3 illustrates the compounding proportion and evaluation of each composition of the working examples and the comparative examples of the present technology.

FIG. 4 illustrates the common components used in each composition of the working examples and the comparative examples of the present technology.

DETAILED DESCRIPTION OF THE TECHNOLOGY

In the rubber composition for tires of the present technology, the rubber component contains diene rubber. Relative to 100 wt. % of the diene rubber, from 5 to 50 wt. % thereof is solution polymerization-produced terminally modified styrene-butadiene rubber (hereinafter referred to as "modified S-SBR"). The modified S-SBR has the glass transition temperature (hereinafter referred to as "Tg") of −50° C. or lower, and preferably from −80 to −50° C. If the Tg of the modified S-SBR is higher than −50° C., wear resistance cannot be sufficiently enhanced. Note that the Tg of the modified S-SBR is measured by differential scanning calorimetry (DSC) in accordance with ASTM (American Society for Testing and Materials) D3418-82. Furthermore, when the modified S-SBR is oil-extended rubber, the Tg is a Tg of the modified S-SBR in a condition free of an oil-extending component (oil).

The modified S-SBR has the vinyl unit content of 25 wt. % or greater and preferably 30 to 50 wt. %. For example, the vinyl unit content is from 25 to 30 wt. %, 30 to 43 wt. %, or 43 to 50 wt. %. If the vinyl unit content in the modified S-SBR is less than 25 wt. %, affinity of the modified S-SBR with silica will be insufficient, the reactivity with silica will be poor and wear resistance cannot be sufficiently enhanced. The upper limit of the vinyl unit content is not particularly limited; however, in order to make the Tg of the modified S-SBR −50° C. or lower for example, the upper limit of the vinyl unit content is preferably 50 wt. % or lower. The vinyl unit content of the modified S-SBR is measured by infrared spectroscopy (Hampton method).

In the present technology, the modified S-SBR is solution polymerization-produced styrene-butadiene rubber in which a molecular terminal or both molecular terminals thereof are modified with functional group(s) having reactivity with a silanol group on the surface of the silica. The functional group that reacts with a silanol group is preferably at least one type selected from a hydroxyl group-containing polyorganosiloxane structure, an alkoxysilyl group, a hydroxyl group, an aldehyde group, a carboxyl group, an amino group, an imino group, an epoxy group, an amide group, a thiol group, and an ether group. Of these, a hydroxyl group is more preferable.

The content of the modified S-SBR is from 5 to 50 wt. %, and preferably from 10 to 30 wt. %, relative to 100 wt. % of the diene rubber. For example, the content of the modified S-SBR is from 5 to 10 wt. %, from 10 to 17 wt. %, from 17 to 30 wt. %, or from 30 to 50 wt. % in 100 wt. % of the diene rubber. If the content of the modified S-SBR is less than 5 wt. %, dispersibility of the silica will be insufficient and wet grip performance and wear resistance cannot be sufficiently enhanced. Furthermore, if the content of the modified S-SBR exceeds 50 wt. %, rolling resistance will deteriorate.

In the present technology, the diene rubber contains from 50 to 95 wt. %, and preferably from 70 to 90 wt. %, of another diene rubber except the modified S-SBR. Examples of the other diene rubber include natural rubber, isoprene rubber, butadiene rubber, unmodified solution polymerization-produced or emulsion polymerization-produced styrene-butadiene rubber, solution polymerization-produced terminally modified styrene-butadiene rubber other than the above-mentioned modified S-SBR, butyl rubber, bromide of isobutylene/p-methylstyrene copolymer rubber, ethylene-propylene-diene rubber, and the like. Of these, natural rubber, butadiene rubber, emulsion polymerization-produced styrene-butadiene rubber, unmodified solution polymerization-produced styrene-butadiene rubber, solution polymerization-produced terminally modified styrene-butadiene rubber other than the above-mentioned modified S-SBR, and bromide of isobutylene/p-methylstyrene copolymer rubber are preferable. Note that solution polymerization-produced terminally modified styrene-butadiene rubber other than the modified S-SBR means solution polymerization-produced terminally modified styrene-butadiene rubber that does not have at least one of the following: the vinyl unit content of 25 wt. % or greater; the glass transition temperature of −50° C. or lower; and a functional group having reactivity with a silanol group. The solution polymerization-produced terminally modified styrene-butadiene rubber other than the modified S-SBR is contained at, for example, 25 to 33 wt. %, 33 to 53 wt. %, 53 to 66 wt. %, 66 to 73 wt. %, 73 to 90 wt. %, or 90 to 95 wt. % in 100 wt. % of the diene rubber.

In the present technology, compounding an aromatic modified terpene resin can enhance the balance between low rolling resistance and wet grip performance and can enhance wet grip performance in particular. As the aromatic modified terpene resin, an aromatic modified terpene resin having a softening point of 100° C. or higher, and preferably from 100 to 130° C., is compounded. For example, an aromatic modified terpene resin having a softening point of 100 to 125° C., or 125 to 130° C. is compounded. If the softening point of the aromatic modified terpene resin is lower than 100° C., it is not possible to achieve the effect of enhancing wet grip performance. Note that the softening point of the aromatic modified terpene resin is measured in accordance with JIS (Japanese Industrial Standards) K 6220-1.

Examples of the aromatic modified terpene resin compounded in the rubber composition for tires of the present technology include aromatic modified terpene resins obtained by copolymerizing a terpene compound such as α-pinene, β-pinene, dipentene, limonene, and camphene with an aromatic vinyl compound such as styrene, α-methylstyrene, vinyl toluene, phenol, and indene. The aromatic modified terpene resin can be a commercially available product such as YS Resin TO-125, TO-115, TO-105, and TR-105, all of which are manufactured by Yasuhara Chemical Co., Ltd.

The compounded amount of the aromatic modified terpene resin is from 2 to 50 parts by weight, and preferably from 5 to 50 parts by weight, relative to 100 parts by weight of the diene rubber. For example, the compounded amount of the aromatic modified terpene resin is set to 2 to 7.5 parts by weight, 5 to 10 parts by weight, 10 to 15 parts by weight, or 15 to 50 parts by weight. If the compounded amount of the aromatic modified terpene resin is less than 2 parts by weight, it is not possible to sufficiently enhance the balance between low rolling resistance and wet grip performance. In addition, if the compounded amount of the aromatic modified terpene resin exceeds 50 parts by weight, it is impossible to achieve predetermined performances (e.g. hardness will be too soft), and wear resistance will decrease.

The rubber composition for tires of the present technology contains two types of silica, that is, silica X, which has a nitrogen adsorption specific surface area of 140 $m^2/g$ or greater, and silica Y, which has a nitrogen adsorption specific surface area of greater than 100 $m^2/g$ and less than 140 $m^2/g$. By compounding the silica X and the silica Y, it is possible to suppress heat build-up in the rubber composition and reduce rolling resistance and improve wet grip performance and wear resistance when using the rubber composition in a tire.

The silica X used in the present technology has a nitrogen adsorption specific surface area of 140 $m^2/g$ or greater, preferably from 150 to 230 $m^2/g$, and more preferably 150 $m^2/g$ or greater and less than 185 $m^2/g$. For example, the nitrogen adsorption specific surface area of the silica X is from 140 to 150 $m^2/g$, from 150 to 160 $m^2/g$, from 160 to 180 $m^2/g$, from 180 to 185 $m^2/g$, from 185 to 220 $m^2/g$, or from 220 to 230 $m^2/g$. By compounding the silica X, it is possible to ensure a high level of wet grip performance and wear resistance. If the nitrogen adsorption specific surface area of the silica X is less than 140 $m^2/g$, wet grip performance and wear resistance will be insufficient.

In addition, the nitrogen adsorption specific surface area of the silica Y is greater than 100 $m^2/g$ and less than 140 $m^2/g$, preferably greater than 100 $m^2/g$ and 130 $m^2/g$ or less, and more preferably from 105 to 130 $m^2/g$. For example, the nitrogen adsorption specific surface area of the silica Y is greater than 100 $m^2/g$ and 105 $m^2/g$ or less, from 105 to 110 $m^2/g$, from 110 to 125 $m^2/g$, from 125 to 130 $m^2/g$, or 130 $m^2/g$ or greater and less than 140 $m^2/g$. By compounding the silica Y having a relatively large particle diameter, it is especially possible to reduce heat build-up and rolling resistance when the rubber composition is used in a tire. If the nitrogen adsorption specific surface area of the silica Y is less than 100 $m^2/g$, it is not possible to enhance wet grip performance. In addition, if the nitrogen adsorption specific surface area of the silica Y is 140 $m^2/g$ or greater, it is not possible to achieve effects of sufficiently reducing rolling resistance. Moreover, the nitrogen adsorption specific surface area of the silica X and that of the silica Y are determined in accordance with the BET method of ASTM D 3037-81.

In the present technology, if the compounded amounts of the silica X and the silica Y relative to 100 parts by weight of the diene rubber are x parts by weight and y parts by weight respectively, the total amount of the silica X and the silica Y (x+y) is from 60 to 130 parts by weight, and preferably from 80 to 130 parts by weight. For example, the total amount of the silica X and the silica Y (x+y) is set to 60 to 70 parts by weight, 70 to 80 parts by weight, or 80 to 130 parts by weight. If the total amount of the silica X and the silica Y (x+y) is less than 60 parts by weight, it is not possible to sufficiently enhance the balance between low rolling resistance and wet grip performance. If the total amount of the silica X and the silica Y (x+y) exceeds 130 parts by weight, the viscosity of the rubber will increase and processability will deteriorate. Furthermore, wear resistance cannot be ensured sufficiently and rolling resistance will significantly deteriorate.

In addition, the compounded amount of the silica X (x) and the compounded amount of the silica Y (y) are required to satisfy the relationship $x/7 < y \leq x$. For example, a relationship $x/7 \leq y \leq x/6.3$, $x/6.3 \leq y \leq x/6$, $x/6 \leq y \leq x/5$, or $x/5 \leq y \leq x$ needs to be satisfied. If the compounded amount of the silica Y (y parts by weight) is not greater than one seventh of the compounded amount of the silica X (x parts by weight), that is, not greater than x/7, it is not possible to enhance the balance between low rolling resistance and wet grip performance. In addition, if the compounded amount of the silica Y (y parts by weight) exceeds the compounded amount of the silica X (x parts by weight), wet grip performance and wear resistance will deteriorate.

The rubber composition of the present technology can contain a reinforcing filler other than silica. Examples of other reinforcing fillers include carbon black, clay, talc, calcium carbonate, mica, aluminum hydroxide, and the like. Of these, by compounding carbon black, it is possible to reinforce the rubber to ensure dry grip performance and abrasion resistance. The compounded amount of another reinforcing filler is from 0 to 19.5 parts by weight relative to 100 parts by weight of the diene rubber.

The proportion of silica is 85 wt. % or greater, and preferably from 87 to 100 wt. %, relative to the total of 100 wt. % of the reinforcing filler that contains the silica, the carbon black, and the like. For example, the proportion of silica is set to 85 to 87.5 wt. %, 87.5 to 88.9 wt. %, 88.9 to 90 wt. %, or 90 to 100 wt. %. If the proportion of silica is less than 85 wt. %, it is not possible to enhance the balance between low rolling resistance and wet grip performance. Here, the compounded amount of the reinforcing filler other than silica is decided on the basis that the proportion of silica is 85 wt. % or greater relative to the total of 100 wt. % of the reinforcing filler, and the compounded amount of the silica relative to the 100 parts by weight of the diene rubber is from 60 to 130 parts by weight.

The silica X and silica Y used in the present technology should be silica having the above-mentioned characteristics, and can be selected as appropriate from among commercially available products. In addition, the silica X and silica Y may be produced using conventional methods so as to have the above-mentioned characteristics. Types of silica that can be used include, for example, wet method silica, dry method silica, surface treated silica, and the like.

In the rubber composition of the present technology, it is preferable for the silica X and silica Y to contain a silane coupling agent, and doing so improves the silica dispersibility and enables enhanced reinforcement of the styrene-butadiene rubber. The compounded amount of the silane coupling agent is preferably from 3 to 15 wt. %, and more preferably from 5 to 12 wt. %, of the compounded amount of the silica. If the compounded amount of the silane coupling agent is less than 3 wt. % of the compounded amount of the silica, it is not possible to sufficiently achieve the effect of enhancing the silica dispersibility. In addition, if the compounded amount of the silane coupling agent exceeds 15 wt. %, the silane coupling agent will undergo condensation, and the desired effect cannot be achieved.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and derivatives thereof, and the like. Derivatives include, for example, NXT-Z (manufactured by Momentive Performance Materials Inc.).

In addition to the above-mentioned fillers, the rubber composition for tires can also contain various types of additives that are commonly used in rubber compositions for tires, such as vulcanization and crosslinking agents, vulcanization accelerators, antiaging agents, plasticizers, and processing aids. These additives may be blended according to any common method to form the rubber composition and may be used in vulcanization or crosslinking. Compounded amounts of these additives may be any conventional amount, as long as the object of the present technology is not impaired. Such a rubber composition can be produced by mixing the above-mentioned components using a known rubber kneading machine such as a Banbury mixer, a kneader, a roll, and the like.

The rubber composition for tires of the present technology can be used in pneumatic tires, and in tire tread portions in particular. A pneumatic tire that uses this rubber composition exhibits excellent wear resistance, low rolling resistance and excellent fuel consumption performance, and also exhibits excellent wet grip performance and exhibits performance corresponding to Grade A in terms of wet grip performance based on the JATMA labeling system.

The present technology is further described below by examples. However, the scope of the present technology is not limited to these examples.

EXAMPLES 25 types of rubber compositions for tires were prepared according to the formulations shown in FIGS. 1 to 3 (Working Examples 1 to 9 and Comparative Examples 1 to 16). The compounding agents, as common components, shown in FIG. 4 (with the exception of the sulfur and the vulcanization accelerator) were compounded with the rubber composition, and the mixture was kneaded in a 1.8 L sealed mixer for 5 minutes. The mixture was then extruded as a master batch, to which the sulfur and the vulcanization accelerator were added. The master batch was then kneaded on an open roll. Note that, in FIGS. 1 to 3, since modified S-SBR 1 and the unmodified SBR each contain 37.5 parts by weight of an oil-extension oil, the compounded amount rows show the actual compounded amount and (in parentheses) the net compounding amount of SBR excluding the oil-extension oil. In addition, the compounded amount of the aroma oil was adjusted as appropriate so that the total oil amount in the rubber composition and/or rubber hardness were at comparable levels. The proportion of silica relative to the total amount of silica and carbon black is shown in the "silica proportion" rows. Moreover, the amounts of the compounding agents shown in FIG. 4 are shown as parts by weight relative to 100 parts by weight of the diene rubbers shown in FIGS. 1 to 3 (net rubber quantity).

The 25 types of the obtained rubber compositions for tires were measured in terms of tan δ (60° C.) according to the following method, and this value was used as an indicator of rolling resistance.

Tan δ (60° C.)

The obtained 25 types of rubber compositions for tires were press-vulcanized for 25 minutes at 160° C. in a die with a prescribed shape so as to produce vulcanized rubber samples. The tan δ (60° C.) value of the obtained vulcanized rubber samples was measured using a viscoelasticity spectrometer (manufactured by Toyo Seiki Seisaku-sho, Ltd.) under the following conditions: 10% initial distortion, ±2% amplitude, 20 Hz frequency, and 60° C. temperature. The obtained results are shown on the "rolling resistance" rows of FIGS. 1 to 3, with an inverse of the value of Comparative Example 1 being 100. Higher index values indicate smaller tan δ (60° C.) values and lower heat build-up, which in turn indicates a lower rolling resistance and superior fuel consumption performance when used in a pneumatic tire.

Next, sets of four pneumatic tires having tire sizes of 205/55 R16 were produced. In each of the sets of four tires, one of the 25 types of rubber compositions for tires described above was used in the tread portion. The wet grip performance of each of the obtained 25 types of pneumatic tires was evaluated according to the method described below.

Wet Grip Performance

The obtained pneumatic tires were fitted to wheels having rim sizes of 6.5 J, the wheels were fitted to a 2.0 liter class test vehicle, and the wet grip performance was measured in accordance with the EU TEST METHOD FOR TYRE WET GRIP GRADING (C1 TYPES). The obtained results are shown on the "wet performance" rows of FIGS. 1 to 3, with an index value of Comparative Example 1 being 100. Greater wet performance index values indicate superior wet grip performance.

The types of raw materials used in FIGS. 1 to 3 are indicated below.

Modified S-SBR 1: solution polymerization-produced styrene-butadiene rubber having a hydroxyl group on a molecular terminal; Tufden E581, manufactured by Asahi Kasei Chemicals Corporation; vinyl unit content: 43 wt. %; Tg: −27° C.; oil-extended rubber containing 37.5 parts by weight of oil relative to 100 parts by weight of rubber component Modified S-SBR 2: solution polymerization-produced styrene-butadiene rubber having a hydroxyl group on a molecular terminal; Nipol NS612, manufactured by Zeon Corporation; vinyl unit content: 31 wt. %; Tg: −63° C.; not oil-extended Unmodified SBR: unmodified solution polymerization-produced styrene-butadiene rubber; Tufden 1335, manufactured by Asahi Kasei Chemicals Corporation; vinyl unit content: 36 wt. %; Tg: −55° C.; oil-extended rubber containing 37.5 parts by weight of oil relative to 100 parts by weight of rubber component BR: butadiene rubber; Nipol BR1220, manufactured by Zeon Corporation NR: Natural rubber, SIR-20

Silica X1: Zeosil 1165MP, manufactured by Rhodia; nitrogen adsorption specific surface area: 160 $m^2/g$ Silica X2: Zeosil 195GR, manufactured by Rhodia; nitrogen adsorption specific surface area: 180 $m^2/g$ Silica X3: Zeosil 200MP, manufactured by Rhodia; nitrogen adsorption specific surface area: 220 $m^2/g$ Silica Y1: Zeosil 115GR, manufactured by Rhodia; nitrogen adsorption specific surface area: 110 $m^2/g$ Silica Y2: Ultrasil 5000GR, manufactured by Degussa; nitrogen adsorption specific surface area: 125 $m^2/g$ Silica Z: Ultrasil 360, manufactured by Degussa; nitrogen adsorption specific surface area: 50 $m^2/g$ Carbon black: Sho Black N234, manufactured by Cabot Japan K. K.

Silane coupling agent: sulfur-containing silane coupling agent; Si69, manufactured by Evonik Degussa Modified terpene resin 1: aromatic modified terpene resin; YS Resin TO-125, manufactured by Yasuhara Chemical Co., Ltd.; softening point: 125° C.

Modified terpene resin 2: aromatic modified terpene resin; YS Resin TO-85, manufactured by Yasuhara Chemical Co., Ltd.; softening point: 85° C.

Aroma oil: Extract 4S, manufactured by Showa Shell Sekiyu K. K.

The types of raw materials used in FIG. 4 are indicated below.

Zinc oxide: Zinc Oxide #3, manufactured by Seido Chemical Industry Co., Ltd.

Stearic acid: industrial stearic acid N, manufactured by Chiba Fatty Acid

Antiaging agent: Ozonon 6C, manufactured by Seiko Chemical Co., Ltd.

Sulfur: "Golden Flower" oil-treated sulfur powder, manufactured by Tsurumi Chemical Industry Co., Ltd.

Vulcanization accelerator 1: Noccelar CZ-G, manufactured by Ouchi Shinko Chemical Industrial Co., Ltd.

Vulcanization accelerator 2: PERKACIT DPG, manufactured by Flexsys

As is clear from FIGS. 1 to 3, it was confirmed that the rubber compositions for tires of Working Examples 1 to 9 maintained/enhanced low rolling resistance (tan δ at 60° C.) and wet grip performance.

Since the rubber composition of Comparative Example 2 contained the unmodified S-SBR in place of the modified S-SBR 2 of Working Example 3, wet grip performance was poor.

Since the rubber composition of Comparative Example 3 contained the butadiene rubber in place of the modified S-SBR 2 of Working Example 3, wet grip performance was poor.

Since the rubber composition of Comparative Example 4 did not contain the modified S-SBR 2 of Working Example 3 and contained only the modified S-SBR 1 as the modified S-SBR, rolling resistance and wear resistance were poor.

Since, in the rubber composition of Comparative Example 5, the compounded amount of the modified S-SBR 2 was less than 5 wt. %, rolling resistance and wear resistance were poor.

Since, in the rubber composition of Comparative Example 6, the compounded amount of the modified S-SBR 2 exceeded 50 wt. %, wet grip performance deteriorated.

Since, in the rubber composition of Comparative Example 7, the aromatic modified terpene resin 2 had a softening point of lower than 100° C., wet grip performance deteriorated.

Since the rubber composition of Comparative Example 8 did not contain the silica Y and the proportion of silica was less than 85 wt. %, it was not possible to enhance rolling resistance or wet grip performance.

Since the rubber composition of Comparative Example 9 did not contain the silica Y, rolling resistance deteriorated.

Since, in the rubber composition of Comparative Example 10, the compounded amount y of the silica Y was less than or equal to one seventh of the compounded amount x of the silica X, it was not possible to enhance rolling resistance.

Since, in the rubber composition of Comparative Example 11, the compounded amount y of the silica Y exceeded the compounded amount x of the silica X, wet grip performance and wear resistance were poor.

Since, in the rubber composition of Comparative Example 12, the total amount of the silica X and the silica Y (x+y) was less than 60 parts by weight, wet performance was not enhanced and, furthermore, rolling resistance deteriorated significantly.

Since, in the rubber composition of Comparative Example 13, the total amount of the silica X and the silica Y (x+y) exceeded 130 parts by weight, although wet performance was enhanced, rolling resistance and wear resistance deteriorated.

As is clear from FIG. 3, since the rubber composition of Comparative Example 14 contained the silica Z having the nitrogen adsorption specific surface area of 100 m$^2$/g or less in place of the silica Y, wear resistance deteriorated.

The rubber composition of Comparative Example 15 did not contain the silica X, but contained two types of silica having nitrogen adsorption specific surface areas of less than 140 m$^2$/g (the silica Y2 and the silica Z), and therefore exhibited inferior wet grip performance and wear resistance.

The rubber composition of Comparative Example 16 did not contain the silica Y, but contained two types of silica having nitrogen adsorption specific surface areas of 140 m$^2$/g or greater (the silica X1 and the silica X3), and therefore exhibited inferior rolling resistance.

The invention claimed is:

1. A rubber composition for tires comprising: per 100 parts by weight of diene rubber containing from 5 to 50 wt. % of solution polymerization-produced terminally modified styrene-butadiene rubber (first modified S-SBR) having a vinyl unit content of 25 wt. % or greater and a glass transition temperature of −50° C. or lower and from 25 to 95 wt. % of solution polymerization-produced terminally modified styrene-butadiene rubber (second modified S-SBR) having a glass transition temperature of higher than −50° C., the total amount of the first modified S-SBR and the second modified S-SBR being 83 wt. % or greater,
from 2 to 50 parts by weight of an aromatic modified terpene resin having a softening point of 100° C. or higher,
a total content of 60 to 130 parts by weight of two types of silica, that is silica X and silica Y;
a functional group of the first modified S-SBR being a functional group having reactivity with a silanol group on a surface of the silica selected from the group consisting of a hydroxyl group-containing polyorganosiloxane structure, an alkoxysilyl group, a hydroxyl group, an aldehyde group, a carboxyl group, an amino group, an imino group, an epoxy group, an amide group, a thiol group, and an ether group;
a proportion of the silica relative to a total amount of a reinforcing filler containing the silica and a carbon black being 85 wt. % or greater;
a nitrogen adsorption specific surface area of the silica X being 140 m$^2$/g or greater;
a nitrogen adsorption specific surface area of the silica Y being greater than 100 m$^2$/g and less than 140 m$^2$/g; and
if a compounded amount of the silica X relative to 100 parts by weight of the diene rubber is x parts by weight and a compounded amount of the silica Y relative to 100 parts by weight of the diene rubber is y parts by weight, a relationship x/7<y≤x being satisfied.

2. The rubber composition for tires according to claim 1, wherein the functional group of the first modified S-SBR is a hydroxyl group.

3. The rubber composition for tires according to claim 1, wherein the first modified S-SBR has the vinyl unit content of 50 wt. % or less.

4. The rubber composition for tires according to claim 1, wherein the first modified S-SBR has the vinyl unit content of 25 to 30 wt. %.

5. The rubber composition for tires according to claim 1, wherein the first modified S-SBR has the vinyl unit content of 30 to 43 wt. %.

6. The rubber composition for tires according to claim 1, wherein the first modified S-SBR has the vinyl unit content of 43 to 50 wt. %.

7. The rubber composition for tires according to claim 1, wherein the first modified S-SBR is solution polymerization-produced styrene-butadiene rubber in which a molecular terminal or both molecular terminals thereof are modified with functional group(s) having reactivity with a silanol group on the surface of the silica, the functional group being a hydroxyl group.

8. The rubber composition for tires according to claim 1, wherein the content of the first modified S-SBR is from 10 to 30 wt. %.

9. The rubber composition for tires according to claim 1, wherein the compounded amount of the aromatic modified terpene resin is from 10 to 15 parts by weight, relative to 100 parts by weight of the diene rubber.

10. The rubber composition for tires according to claim 1, wherein the nitrogen adsorption specific surface area of the silica X comprises from about 150 m$^2$/g to about 230 m$^2$/g.

11. The rubber composition for tires according to claim 1, wherein a nitrogen adsorption specific surface area of the silica Y is greater than 100 m$^2$/g and 130 m$^2$/g or less.

12. The rubber composition for tires according to claim 1, wherein the total amount of the silica X and the silica Y (x+y) is from 80 to 130 parts by weight.

13. The rubber composition for tires according to claim 1, wherein the proportion of silica is from 87 to 100 wt. %, relative to the total of 100 wt. % of the reinforcing filler that contains the silica.

14. The rubber composition for tires according to claim 1, wherein the first modified S-SBR is contained from 5 to 17 wt. %.

15. The rubber composition for tires according to claim 14, wherein the glass transition temperature of the first modified S-SBR is −63 to −50° C.

16. The rubber composition for tires according to claim 1, wherein the nitrogen adsorption specific surface area of the silica X being 180 m$^2$/g or greater.

17. A pneumatic tire using the rubber composition for tires described in claim 1.

18. A pneumatic tire using the rubber composition for tires described in claim 2.

* * * * *